United States Patent
Kinoshita et al.

(10) Patent No.: US 8,872,385 B2
(45) Date of Patent: Oct. 28, 2014

(54) WIRELESS POWER TRANSMISSION SYSTEM

(75) Inventors: Keisuke Kinoshita, Kyoto (JP); Junichi Kawamura, Osaka (JP); Shutai Okamura, Cupertino, CA (US)

(73) Assignee: Panasonic Corporation, Osaka (JP)

( * ) Notice: Subject to any disclaimer, the term of this patent is extended or adjusted under 35 U.S.C. 154(b) by 514 days.

(21) Appl. No.: 13/329,433

(22) Filed: Dec. 19, 2011

(65) Prior Publication Data

US 2012/0161538 A1 Jun. 28, 2012

(30) Foreign Application Priority Data

Dec. 22, 2010 (JP) ................. 2010-285799
Dec. 1, 2011 (JP) ................. 2011-263408

(51) Int. Cl.
 *H01F 27/42* (2006.01)
(52) U.S. Cl.
 USPC ........................................ 307/104
(58) Field of Classification Search
 USPC ........................................ 307/104
 See application file for complete search history.

(56) References Cited

U.S. PATENT DOCUMENTS

| 5,345,231 | A | 9/1994 | Koo et al. |
| 2004/0134985 | A1* | 7/2004 | Deguchi et al. ............ 235/451 |
| 2009/0058190 | A1 | 3/2009 | Tanaka |
| 2009/0286476 | A1 | 11/2009 | Toncich et al. |
| 2010/0184371 | A1 | 7/2010 | Cook et al. |

FOREIGN PATENT DOCUMENTS

JP 2004-206245 A 7/2004

* cited by examiner

*Primary Examiner* — Robert L. Deberadinis
(74) *Attorney, Agent, or Firm* — Renner, Otto, Boisselle & Sklar, LLP

(57) ABSTRACT

A wireless power transmission system transmits power wirelessly from a power transmitter to a power receiver. The power transmitter includes a class E amplifier, a transmitting-end resonant circuit, a detector that detects a voltage or current waveform at a predetermined position in the class E amplifier in accordance with the impedance of the transmitting-end resonant circuit as viewed from the class E amplifier, and a signal extractor that extracts a signal according to the waveform. The power receiver includes a receiving-end resonant circuit, a rectifier circuit, a power reproducing section, and an impedance changer connected between the rectifier circuit and the power reproducing section to change its impedance. When the impedance is changed, the detector detects the waveform variation and the signal extractor extracts and outputs a signal corresponding to the waveform detected by the detector.

22 Claims, 9 Drawing Sheets

WIRELESS POWER TRANSMISSION SYSTEM

BACKGROUND OF THE INVENTION

1. Field of the Invention

The present invention relates to a wireless power transmission system, which includes a power transmitter and a power receiver and which transmits a data signal from the power receiver to the power transmitter, and vice versa, while transmitting power from the power transmitter to the power receiver.

2. Description of the Related Art

Recently, as cellphones, terrestrial digital TV broadcasting and their related technologies have been further advanced, wireless receivers that receive text data, audio data and telecasts wirelessly as radio waves without using a cable connection have become more and more popular. Currently, electric power is still supplied through a cable to most of those wireless receivers in order to charge its built-in battery to the point that the device is ready to use. However, as those wireless telecommunications technologies have been developing, a lot of people have been attempting nowadays to transmit electric power, as well as those data signals, wirelessly, too.

For example, wireless power transmission technologies by electromagnetic induction have already been applied to various consumer electronic products such as electric shavers and motorized tooth brushes, and have increased their handiness for general consumers successfully. For instance, Japanese Patent Application Laid-Open Publication No. 2004-206245 (which will be referred to herein as Patent Document No. 1 for convenience sake) discloses a configuration for a system of which the power transmitter and power receiver have their coils coupled together electromagnetically to transmit power wirelessly from the power transmitter to the power receiver and which transmits data from the power transmitter to the power receiver, and vice versa.

Hereinafter, it will be described with reference to FIG. 10 how the system of Patent Document No. 1 works.

FIG. 10 illustrates a configuration for a conventional non-contact data reading and writing system. In this system, a reader/writer (power transmitter) 911 and a non-contact IC card (power receiver) 992 are electromagnetically coupled together to read and write data by a non-contact method. The wireless transmitting section 131 of the reader/writer 911 generates power and a data signal to be transmitted to the non-contact IC card 992. For that purpose, a periodic signal generator 61 outputs a periodic signal, of which one period is represented by substantially the same frequency fo as the resonant frequency of a transmitting-end resonant circuit 91 and a receiving-end resonant circuit 92. Based on a data signal 111 to be transmitted to the non-contact IC card 992, a modulator 9 outputs a waveform that has been modulated with the data signal 111 by using the periodic signal supplied from the periodic signal generator 61 as a carrier. Next, an amplifier amplifies the output of the modulator 9 to required amplitude. Then, a matching circuit 21 achieves impedance matching and outputs a waveform including power and the data signal in combination that has been obtained by modulating the periodic signal with the data signal 111. This is the output of the wireless transmitting section 131.

The output of the wireless transmitting section 131 is supplied to a circulator 171, which passes an input from the matching circuit 21 to the transmitting-end resonant circuit 91, an input from the transmitting-end resonant circuit 91 to a wireless receiving section 141 and an input from the wireless receiving section 141 to the matching circuit 21, respectively.

It should be noted that actually, the wireless receiving section 141 rarely outputs anything to the matching circuit 21. Thus, it can be said that the output of the wireless transmitting section 131 is almost always passed by the circulator 171 to the transmitting-end resonant circuit 91.

Since the transmitting-end and receiving-end resonant circuits 91 and 92 are electromagnetically coupled together by a non-contact method via electromagnetic induction, the output of the wireless transmitting section 131 is transmitted to an IC chip 32 by way of the transmitting-end resonant circuit 91 and the receiving-end resonant circuit 92. In response, the IC chip 32 gets power to drive itself from the data signal transmitted and receives the data signal. In this manner, power and data are transmitted from the reader/writer 911 to the non-contact IC card 992.

Next, it will be described how to transmit data from the non-contact IC card 992 to the reader/writer 911. The IC chip 32 changes the value of the load resistance (not shown) of the receiving-end resonant circuit 92 according to the data signal to be transmitted. If the value of the load resistance is changed, the impedance of the transmitting-end resonant circuit 91 as viewed from the circulator 171 changes in the reader/writer 911. As a result, among various signals transmitted inside the reader/writer 911, a signal that has been output from the circulator 171 to the transmitting-end resonant circuit 91 and then reflected back from the transmitting-end resonant circuit 91 to the circulator 171 has its waveform affected by the value of the load resistance of the receiving-end resonant circuit 92 of the non-contact IC card 992.

The circulator 171 outputs that signal waveform that has been reflected back to itself to the wireless receiving section 141. In response, a demodulator 101 demodulates the data signal by sensing the variation in the signal waveform due to the change of the load resistance, and outputs a received signal 121 as the data signal that has been transmitted from the non-contact IC card 992 to the reader/writer 911.

By using the circulator in this manner, the output of the wireless transmitting section 131 is transmitted to the non-contact IC card 992 just as intended without being diverted to the wireless receiving section 141. As a result, the power loss can be cut down. In addition, the reflected wave of the transmitting-end resonant circuit 91 that has been produced due to the change of the load resistance is input to only the wireless receiving section 141, not to the wireless transmitting section 131. Consequently, it is possible to prevent a variation in the signal waveform from decreasing to a hardly sensible level, and therefore, the demodulator 101 can demodulate the data signal easily.

Using such a configuration, power is transmitted from the reader/writer (power transmitter) 911 to the non-contact IC card (power receiver) 992 and data can be transmitted from the power receiver to the power transmitter, and vice versa.

However, whenever a circulator is included in a power transmitter, insertion loss due to the insertion of the circulator is inevitable.

Such an insertion loss is non-negligible in those applications that require medium to high powers to drive AV devices and electric vehicles, which have been developed more and more extensively these days. This is because in those medium to high power applications, the power transfer efficiency achieved should be as close to what is achieved by cable connection as possible, and therefore, factors that would cause some loss should be eliminated as much as possible.

It should be noted that the technology disclosed in Patent Document No. 1 is supposed to be applied to transmitting power and data to a non-contact IC card and the power to be transmitted is on the order of just a few μW. That is why in the applications intended by Patent Document No. 1, such insertion loss is not a problem.

Also, the system shown in FIG. 10 is used mainly to transmit and receive data and the wireless transmission of power is required just for the purpose of transmitting and receiving data. Conversely, if the main purpose is to transmit power wirelessly rather than to transmit and receive data, then the power transfer efficiency should be high.

In order to achieve high power transfer efficiency, a class E amplifier is often used. A class E amplifier is known as a circuit that can convert a DC voltage supplied from a DC power supply into an AC signal efficiently. Unlike a class A amplifier or a class B amplifier, a class E amplifier does not amplify an input signal but receives an input periodic signal as a trigger and converts a DC voltage into an AC voltage efficiently. A class E amplifier can be used effectively in a system that generates a single frequency and that transmits power from a power transmitter to a power receiver using a signal with a particular resonant frequency.

With such efficient wireless power transmission ensured, introduction of the ability to transmit and receive data should also be taken into consideration. For example, to transmit power wirelessly and safely so that the power being transmitted is not stolen by a third party, authentication and arbitration should be done between a power transmitter and a power receiver. For that purpose, a bidirectional data transmission capability, including the ability to transmit data from a power receiver to a power transmitter and the ability to transmit data from the power transmitter to the power receiver, is required to say the least.

It is therefore an object of the present invention to provide a wireless power transmission system that can achieve high power transfer efficiency without using a circulator or any other device to cause some insertion loss and that can transmit data bidirectionally from a power receiver to a power transmitter, and vice versa.

SUMMARY OF THE INVENTION

A wireless power transmission system according to the present invention is designed to transmit power wirelessly from a power transmitter to a power receiver. The power transmitter includes: a periodic signal generator, which generates a periodic signal; a switch, which performs a switching operation in response to the periodic signal supplied from the periodic signal generator; a first inductor, which connects a DC power supply to one terminal of the switch; a first capacitor, which connects the one terminal of the switch to ground; an LC resonant circuit, which is comprised of a second inductor and a second capacitor that are connected to the one terminal of the switch; a transmitting-end resonant circuit, which is connected to the LC resonant circuit and of which the resonant frequency substantially corresponds with one period of the periodic signal; a detector, which detects a voltage at the one terminal of the switch or current or a voltage at the other terminal of the switch; and a signal extractor, which makes extracts a signal from the output of the detector. The power transmitter performs a class E amplification operation that converts power supplied from the DC power supply into an AC signal that has substantially the same frequency as the periodic signal by turning the switch using the periodic signal. The power receiver includes: a receiving-end resonant circuit, which is coupled electromagnetically to, and produces resonance with, the transmitting-end resonant circuit; a rectifier circuit, which rectifies a signal that has been received at the receiving-end resonant circuit; an impedance changer, which connects the rectifier circuit to a power reproducing section; the power reproducing section, which reproduces power for the power receiver based on the output of the impedance changer; and a controller, which changes the impedance of the impedance changer according to the signal to be transmitted from the power receiver to the power transmitter.

When the controller changes the impedance of the impedance changer, either the amount of current flowing from the other terminal of the switch to the ground or a voltage at the other terminal of the switch varies. The detector senses that variation, thereby transmitting the signal from the power receiver to the power transmitter The signal extractor may extract a signal from the output of the detector by using the output of the periodic signal generator as a timing signal.

The detector may be implemented as a resistive element. In detecting the current or voltage at the other terminal of the switch, the detector may apply a voltage, which has been generated by the current flowing from the switch to the ground, to the signal extractor. And the signal extractor may extract the signal based on the applied voltage.

The switch may be made up of either field effect transistors or bipolar transistors.

Another wireless power transmission system according to the present invention is also designed to transmit power wirelessly from a power transmitter to a power receiver. The power transmitter includes: a periodic signal generator, which generates a periodic signal; a switch, which performs a switching operation in response to the periodic signal supplied from the periodic signal generator; a first inductor, which connects a DC power supply to one terminal of the switch; a first capacitor, which connects the one terminal of the switch to ground; an LC resonant circuit, which is comprised of a second inductor and a second capacitor that are connected to the one terminal of the switch; a transmitting-end resonant circuit, which is connected to the LC resonant circuit and of which the resonant frequency substantially corresponds with one period of the periodic signal; a detector, which detects a voltage at the one terminal of the switch or current or a voltage at the other terminal of the switch; a signal extractor, which extracts a signal from the output of the detector; and a voltage controller, which controls the output voltage of the DC power supply in accordance with a first transmission signal to be transmitted from the power transmitter to the power receiver. The power transmitter performs a class E amplification operation that converts power supplied from the DC power supply into an AC signal that has substantially the same frequency as the periodic signal by turning the switch using the periodic signal. The power receiver includes: a receiving-end resonant circuit, which is coupled electromagnetically to, and produces resonance with, the transmitting-end resonant circuit; a rectifier circuit, which rectifies a signal that has been received at the receiving-end resonant circuit; an impedance changer, which connects the rectifier circuit to a power reproducing section; the power reproducing section, which reproduces power for the power receiver based on the output of the impedance changer; a demodulator, which demodulates the first transmission signal based on the output of the impedance changer; and a controller, which changes the impedance of the impedance changer according to a second transmission signal to be transmitted from the power receiver to the power transmitter.

When the controller changes the impedance of the impedance changer, either the amount of current flowing from the other terminal of the switch to the ground or a voltage at the other terminal of the switch varies. The detector senses that variation, thereby transmitting the second transmission signal from the power receiver to the power transmitter.

The signal extractor may extract the signal from the output of the detector by using the output of the periodic signal generator as a timing signal.

The detector may be implemented as a resistive element. In detecting the current or voltage at the other terminal of the switch, the detector may apply a voltage, which has been generated by the current flowing from the switch to the ground, to the signal extractor. And the signal extractor may extract the signal based on the applied voltage.

The voltage controller may change the output voltage of the DC power supply according to the first transmission signal, thereby making the output signal of the transmitting-end resonant circuit have a waveform, of which the amplitude has been modulated with the first transmission signal by using, as a carrier, an AC signal, of which the frequency is substantially equal to the resonant frequency of the transmitting-end and receiving-end resonant circuits.

The voltage controller may carry out pulse width modulation on the output voltage of the DC power supply according to the first transmission signal, thereby making the output signal of the transmitting-end resonant circuit have a waveform, of which the pulse width has been modulated with the first transmission signal by using, as a carrier, an AC signal, of which the frequency is substantially equal to the resonant frequency of the transmitting-end and receiving-end resonant circuits.

The switch may be made up of either field effect transistors or bipolar transistors.

Still another wireless power transmission system according to the present invention is also designed to transmit power wirelessly from a power transmitter to a power receiver. The power transmitter includes: a periodic signal generator, which generates a periodic signal; a pulse width modulation signal generator, which generates a pulse width modulation signal in accordance with a first transmission signal to be transmitted from the power transmitter to the power receiver; a modulator, which modulates the periodic signal with the pulse width modulation signal; a switch, which performs a switching operation in accordance with the output of the modulator; a first inductor, which connects a DC power supply to one terminal of the switch; a first capacitor, which connects the one terminal of the switch to ground; an LC resonant circuit, which is comprised of a second inductor and a second capacitor that are connected to the one terminal of the switch; a transmitting-end resonant circuit, which is connected to the LC resonant circuit and of which the resonant frequency substantially corresponds with one period of the periodic signal; a detector, which detects a voltage at the one terminal of the switch or current or a voltage at the other terminal of the switch; and a signal extractor, which extracts a signal from the output of the detector. The power receiver includes: a receiving-end resonant circuit, which is coupled electromagnetically to, and produces resonance with, the transmitting-end resonant circuit; a rectifier circuit, which rectifies a signal that has been received at the receiving-end resonant circuit; an impedance changer, which connects the rectifier circuit to a power reproducing section; the power reproducing section, which reproduces power for the power receiver based on the output of the impedance changer; an envelope detector, which detects the envelope of the output of the impedance changer; a pulse width modulation signal demodulator, which demodulates the first transmission signal based on the output of the envelope detector; and a controller, which changes the impedance of the impedance changer according to second transmission signal to be transmitted from the power receiver to the power transmitter.

In a period during which the periodic signal is provided as the output of the modulator, the power transmitter may perform a class E amplification operation that converts power supplied from the DC power supply into an AC signal that has substantially the same frequency as the periodic signal by turning the switch. In an interval during which there is no output of the modulator, the power transmitter may stop outputting.

When the controller changes the impedance of the impedance changer, either the amount of current flowing from the other terminal of the switch to the ground or a voltage at the other terminal of the switch varies. The detector senses that variation, thereby transmitting the second transmitting signal from the power receiver to the power transmitter.

The signal extractor may extract the signal from the output of the detector by using the output of the periodic signal generator as a timing signal.

The signal extractor may use the output of the modulator, which has been obtained by modulating the periodic signal with the pulse width modulation signal, as a timing signal, may determine that the output of the modulator is valid as the timing signal if the periodic signal is provided as the output of the modulator but that the output of the modulator is invalid as the timing signal if no periodic signal is provided as the output of the modulator, and may extract the signal from the output of the detector only if the output of the modulator is determined to be valid as the timing signal.

The detector may be implemented as a resistive element. In detecting the current or voltage at the other terminal of the switch, the detector may apply a voltage, which has been generated by the current flowing from the switch to the ground, to the signal extractor. And the signal extractor may extract the signal based on the applied voltage.

The switch may be made up of either field effect transistors or bipolar transistors.

Yet another wireless power transmission system according to the present invention is also designed to transmit power wirelessly from a power transmitter to a power receiver. The power transmitter includes: a class E amplifier, which produces AC energy; a transmitting-end resonant circuit, which transmits the AC energy into space; a detector, which detects a voltage or current waveform at a predetermined position in the class E amplifier in accordance with the impedance of the transmitting-end resonant circuit as viewed from the class E amplifier; and a signal extractor, which extracts a signal according to the waveform. The power receiver includes: a receiving-end resonant circuit, which receives at least a part of the AC energy that has been transmitted by the transmitting-end resonant circuit; a rectifier circuit, which rectifies and outputs at least the part of the AC energy that has been received at the receiving-end resonant circuit; a power reproducing section, which outputs power based on the output of the rectifier circuit; and an impedance changer, which is connected between the rectifier circuit and the power reproducing section to change the impedance. As the impedance changer changes the impedance, the detector detects a waveform when the impedances match and a waveform when the impedance do not match and the signal extractor extracts and outputs a signal associated with the waveform that has been detected by the detector.

The power transmitter may further include a voltage controller that modulates the output voltage of the class E amplifier according to transmission signal to be transmitted. The power receiver may further include a demodulator, which demodulates the transmission signal by subjecting the output of the rectifier circuit to predetermined waveform processing.

The power transmitter may further include a periodic signal generator, which generates a periodic signal, a PWM signal generator, which carries out a pulse width modulation on the transmission signal to be transmitted, and a modulator, which multiplies together the periodic signal and the pulse-width-modulated transmission signal. And the power receiver may further include an envelope detector, which performs envelope detection waveform processing on the output of the rectifier circuit, and a PWM signal demodulator, which carries out a pulse width demodulation on the output of the rectifier circuit that has been subjected to the waveform processing, thereby outputting the transmission signal.

According to a preferred embodiment of the present invention, while power is being transmitted wirelessly between a power transmitter and a power receiver, the amount of current flowing through the switch of a class E amplifier is monitored. As a result, data can be transmitted efficiently from the power receiver to the power transmitter, and vice versa, with a DC voltage converted into an AC current signal efficiently by the class E amplifier.

With this data transmission method adopted, device authentication to transmit power wirelessly between a power transmitter and a power receiver can get done easily. As a result, power can be transmitted wirelessly to only an authenticated device without transmitting power to any other unauthorized power receiver.

Other features, elements, processes, steps, characteristics and advantages of the present invention will become more apparent from the following detailed description of preferred embodiments of the present invention with reference to the attached drawings.

Figure 3:
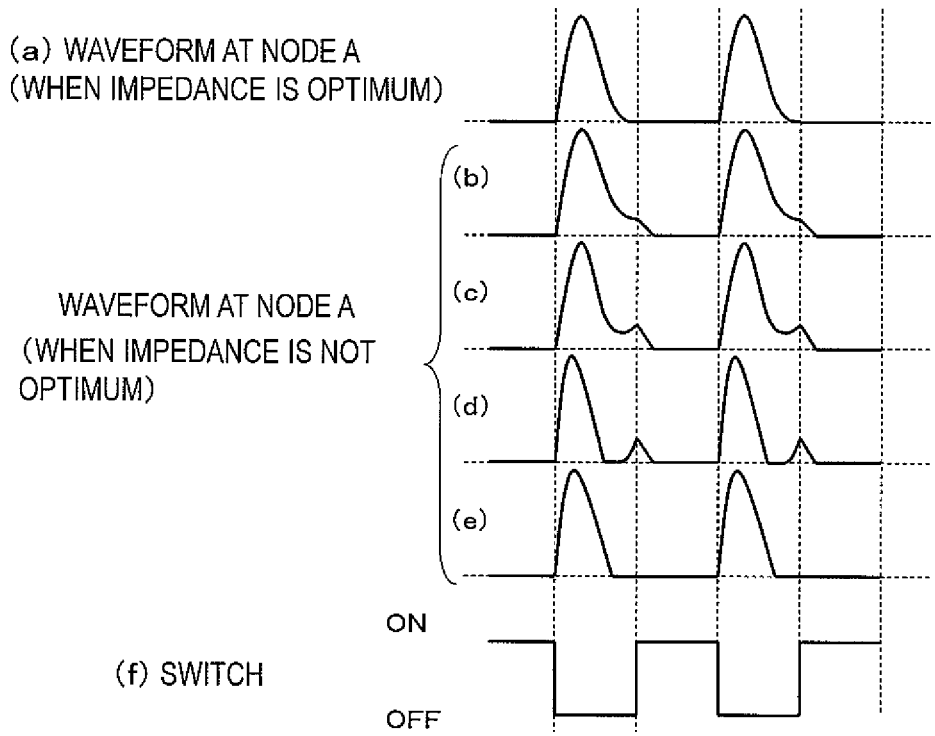

Portion (a) of FIG. 3 illustrates the waveform at the node A of the class E amplifier 511 when the impedance is optimum. Portions (b) through (e) of FIG. 3 illustrate possible variations in the waveform at the node A when the impedance is not optimum. And portion (f) of FIG. 3 shows the timings to turn a switch 31 ON or OFF.

Figure 4:
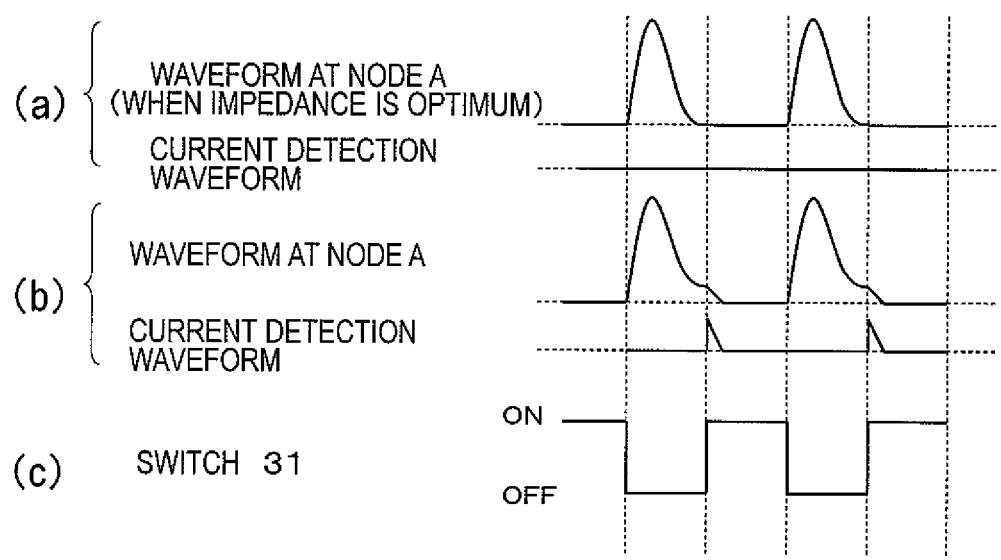

Portion (a) of FIG. 4 shows the waveform at the node A and the current waveform detected by the detector 41 of the power transmitter 1 when the impedance is optimum. Portion (b) of FIG. 4 shows the waveform at the node A and the current waveform detected by the detector 41 of the power transmitter 1 when the impedance has changed from the state shown in portion (a). And portion (c) of FIG. 4 shows the timings to turn the switch 31 ON or OFF.

Figure 5:
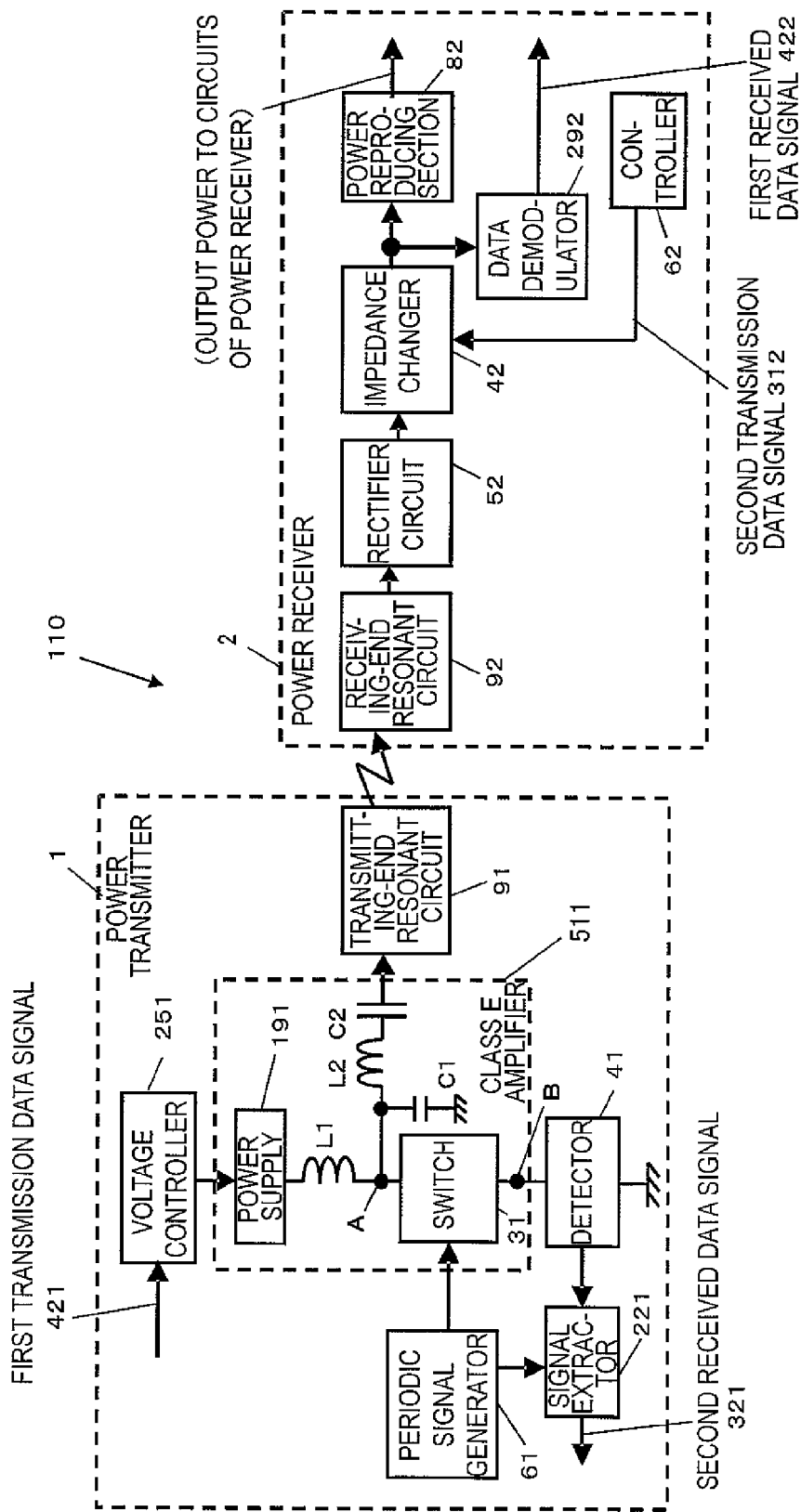

FIG. 5 is a block diagram illustrating a configuration for a wireless power transmission system 110 as a second specific preferred embodiment of the present invention.

Figure 6:
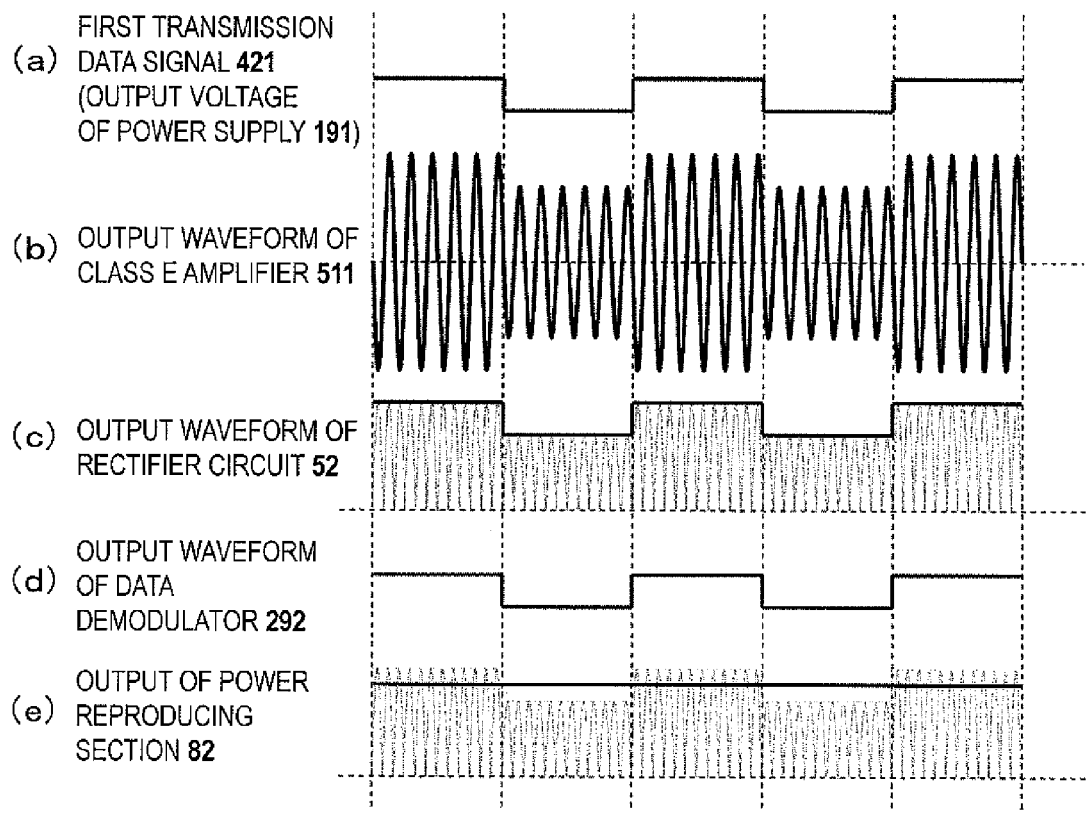

Portions (a) through (e) of FIG. 6 show the waveforms of signals to be generated or detected in the wireless power transmission system 110.

Figure 7:
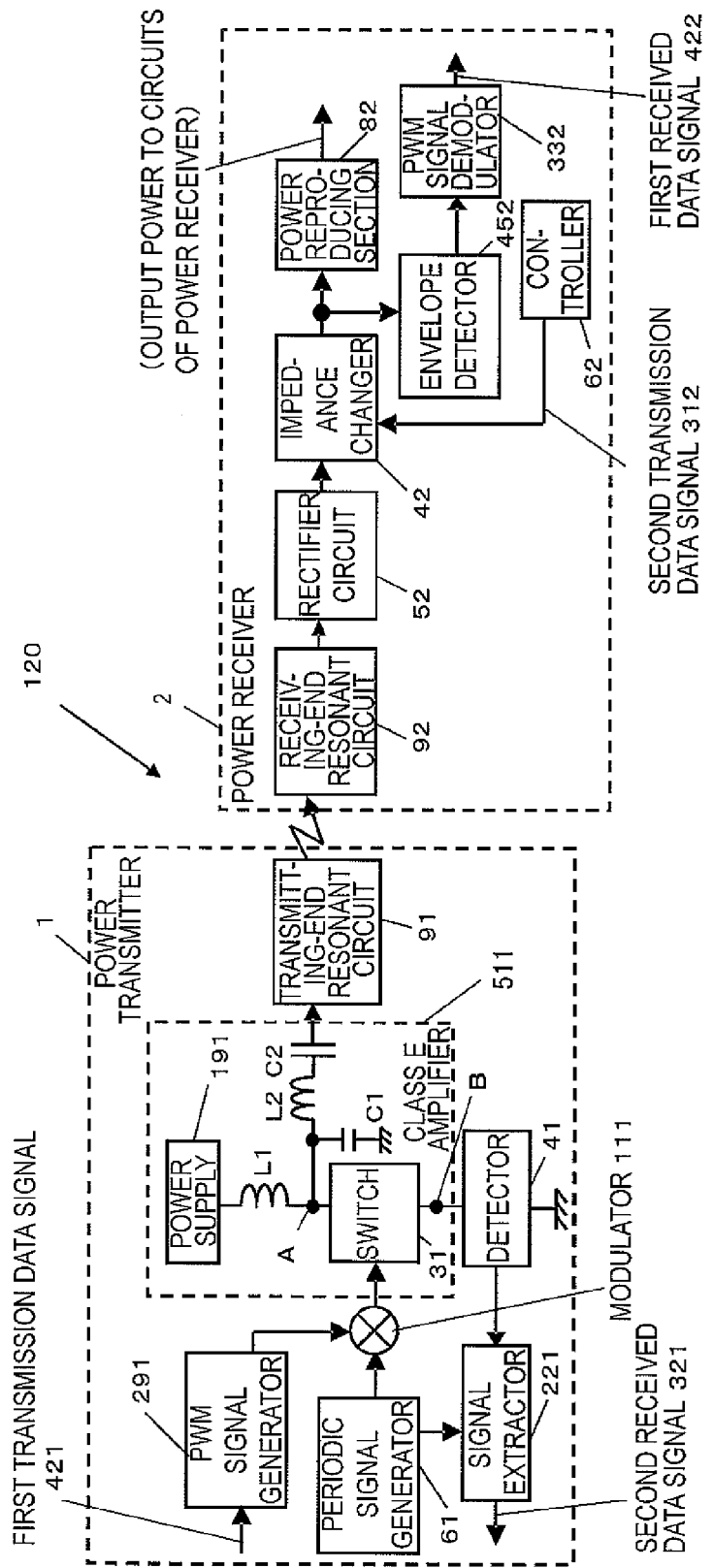

FIG. 7 is a block diagram illustrating a configuration for a wireless power transmission system 120 as a third specific preferred embodiment of the present invention.

Figure 8:
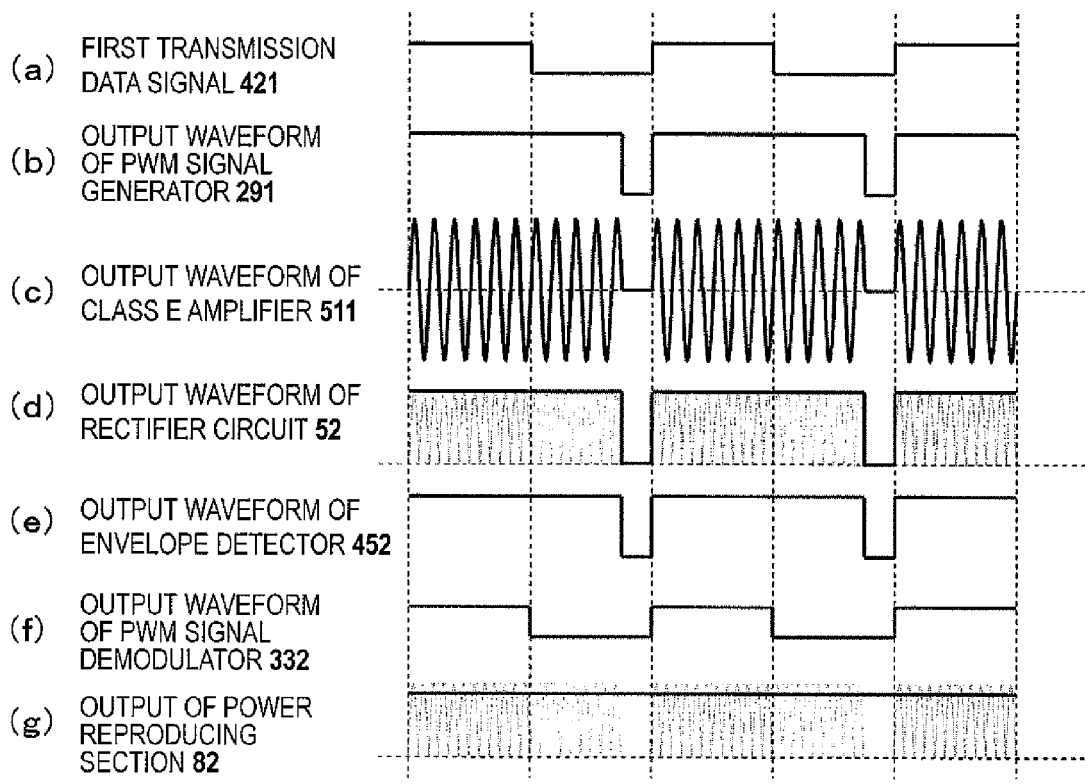

Portions (a) through (g) of FIG. 8 show the waveforms of signals to be generated or detected in the wireless power transmission system 120.

Figure 9:
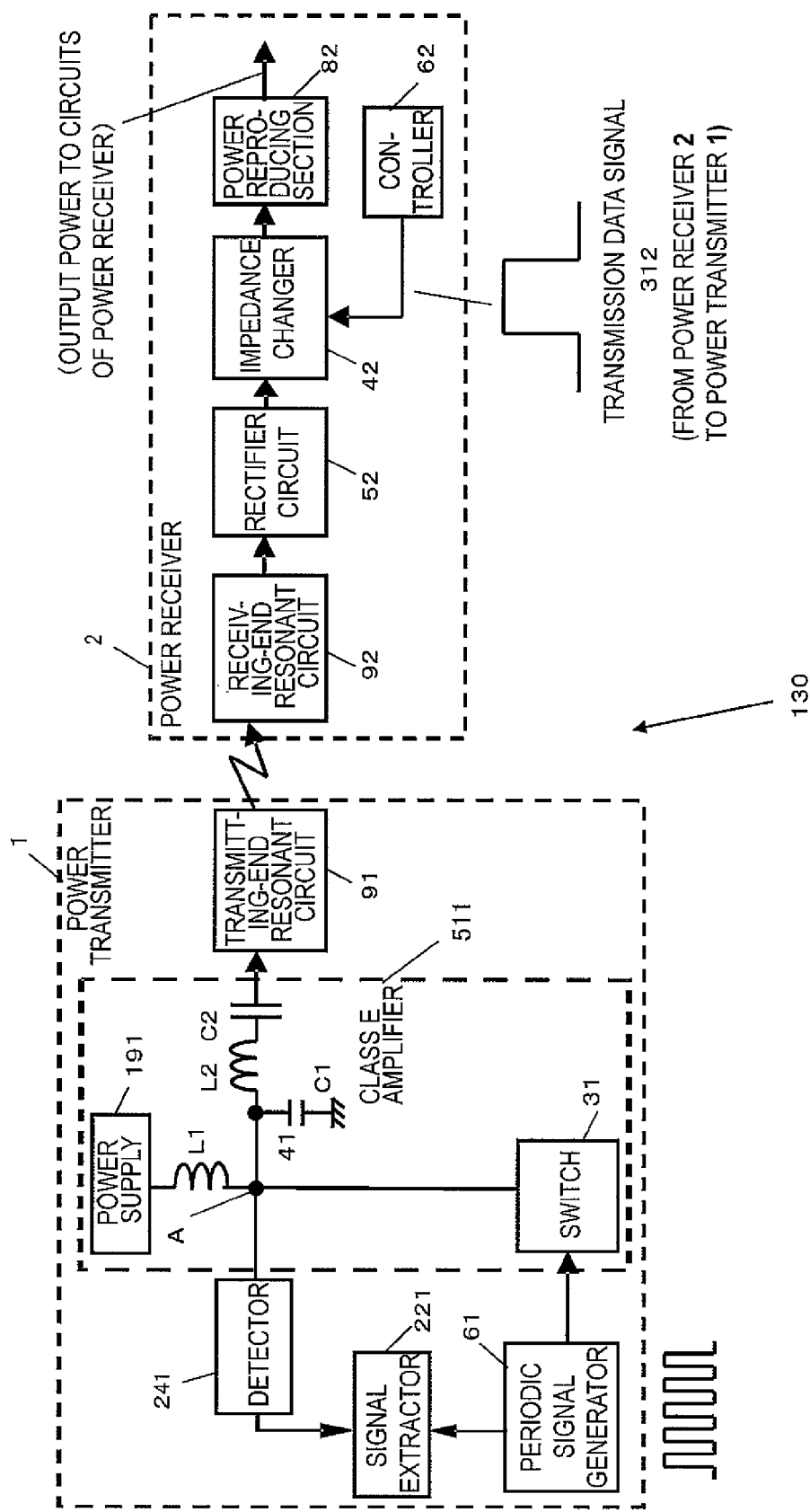

FIG. 9 is a block diagram illustrating a configuration for a wireless power transmission system 130 as a modified example of the first preferred embodiment of the present invention.

Figure 10:
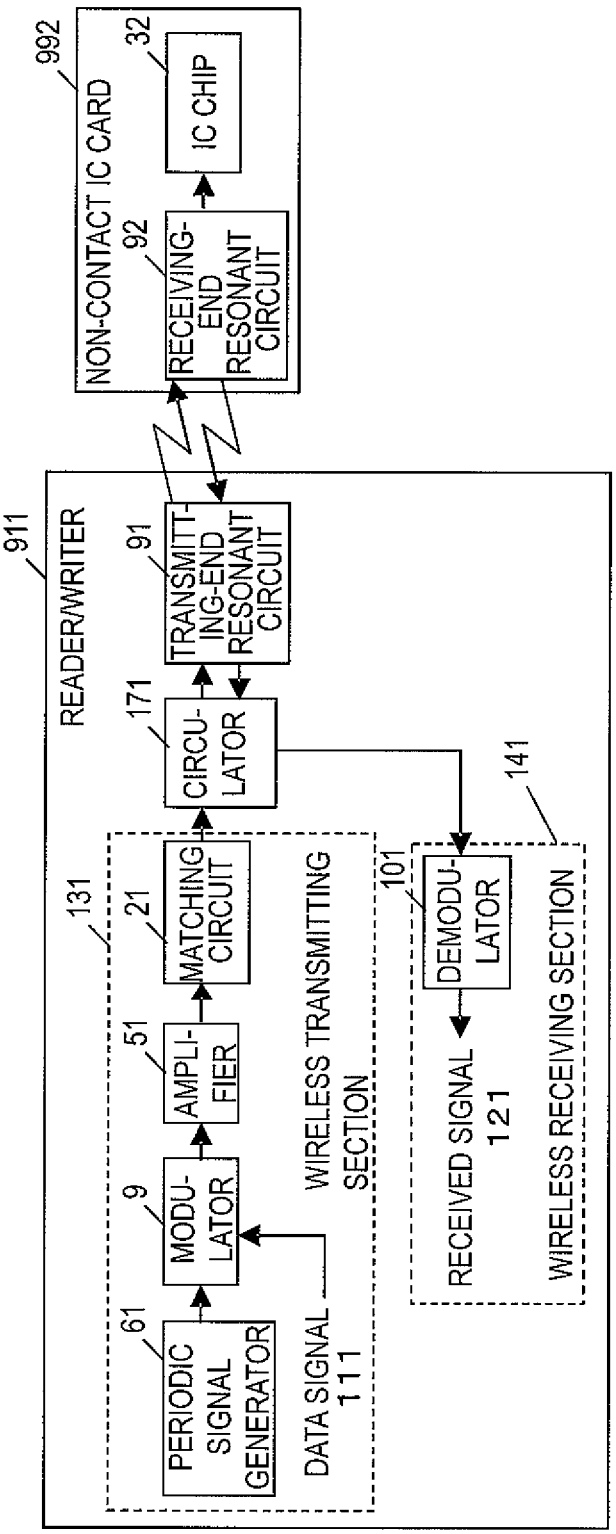

FIG. 10 illustrates a configuration for a conventional non-contact data reading and writing system.

DETAILED DESCRIPTION OF PREFERRED EMBODIMENTS

Hereinafter, preferred embodiments of a wireless power transmission system according to the present invention will be described with reference to the accompanying drawings.

Embodiment 1

Figure 1:
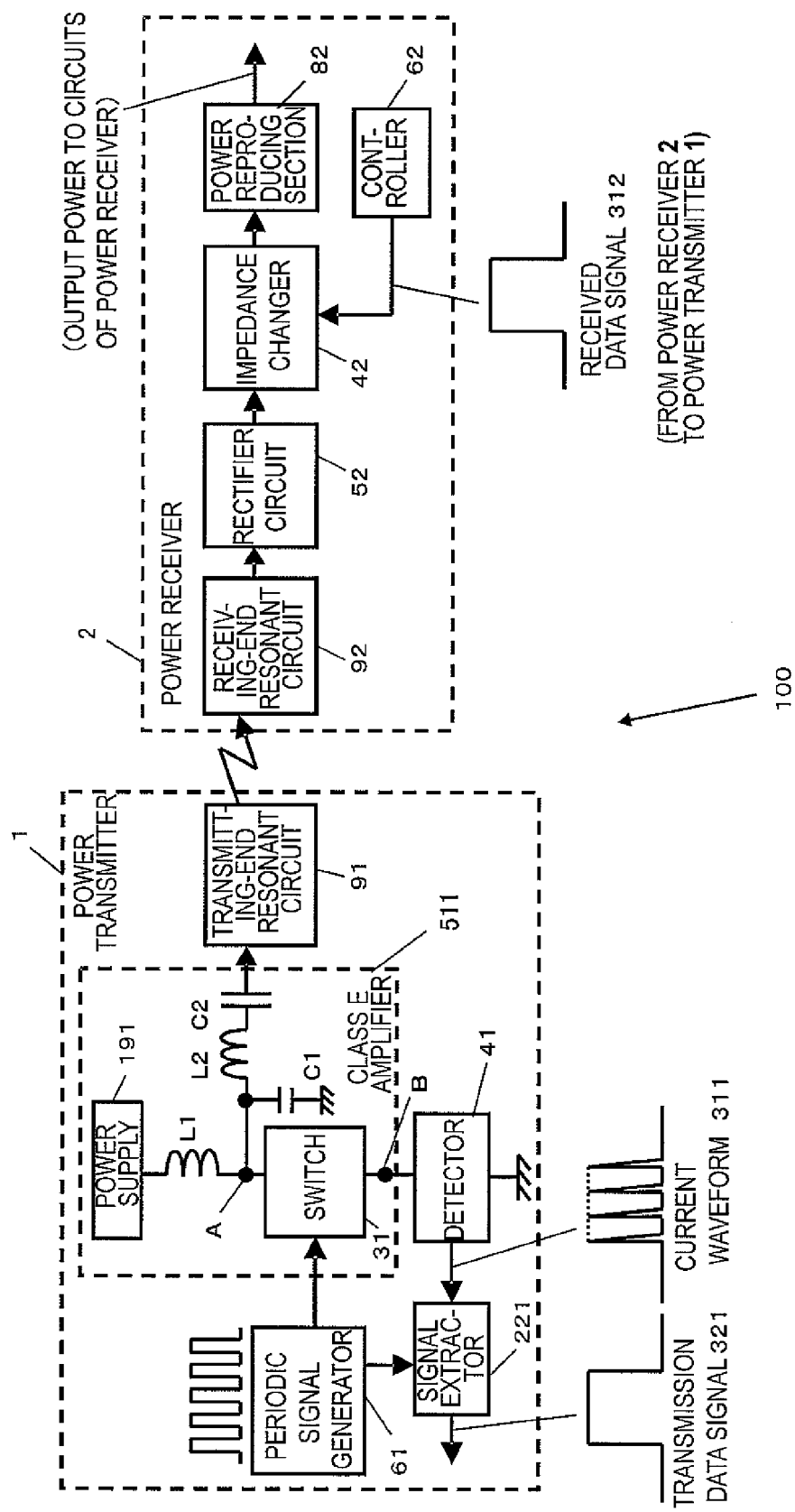
FIG. 1 is a block diagram illustrating a configuration for a wireless power transmission system 100 as a first specific preferred embodiment of the present invention.

FIG. 1 is a block diagram illustrating a configuration for a wireless power transmission system 100 as a first specific preferred embodiment of the present invention. This wireless power transmission system 100 includes a power transmitter 1 and a power receiver 2. The power transmitter 1 includes a periodic signal generator 61, a class E amplifier 511, a transmitting-end resonant circuit 91, a detector 41, and a signal extractor 221.

On the other hand, the power receiver 2 includes a receiving-end resonant circuit 92, a rectifier circuit 52, an impedance changer 42, a power reproducing section 82, and a controller 62.

The transmitting-end resonant circuit 91 of the power transmitter 1 and the receiving-end resonant circuit 92 of the power receiver 2 together form a resonant circuit that is a combination of a transmission coil, a reception coil, and other elements that are connected to those coils either in parallel or in series. If the transmitting-end resonant circuit 91 and the receiving-end resonant circuit 92 are electromagnetically coupled together at a resonant frequency fo to produce resonance between them by a non-contact method, the periodic signal generator 61 of the power transmitter 1 generates a periodic signal with the frequency fo. This periodic signal is used to transmit power wirelessly.

The class E amplifier 511 may be implemented as a class E amplifier, outputs AC energy with a predetermined frequency and includes a switch 31, a power supply 191, a first inductor L1, a second inductor L2, a first capacitor C1 and a second capacitor C2. In this class E amplifier 511, the constants of the respective circuit elements are determined so that the class E amplifier 511 performs a class E amplification operation.

Figure 2:
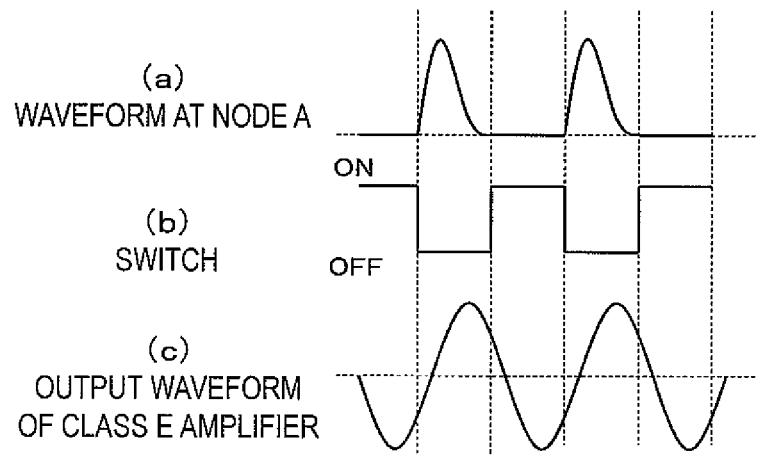
FIG. 2 shows the waveforms of signals that are related to a class E amplifier 511.

Hereinafter, it will be described with reference to FIG. 2 how this class E amplifier 511 operates. FIG. 2 shows the waveforms of signals that are related to the class E amplifier 511.

The switch 31 turns ON or OFF in response to the signal supplied from the periodic signal generator 61 (see portion (b) of FIG. 2). Suppose the switch 31 in ON state has just turned OFF. Then, the voltage at the node A shown in FIG. 1 rises as shown in portion (a) of FIG. 2. This phenomenon is observed because L1 functions so as to keep the amount of current flowing unchanged even if the switch 31 has turned. As current continues to flow from L1 even after the switch 31 has turned OFF, charges are stored in C1, thereby raising the voltage at the node A. After a while, though, the potential at the node A soon stops rising and starts falling instead. This phenomenon is observed because the charges that have been stored in C1 start to flow toward L2 and C2.

In this case, to make the class E amplifier 511 operate with the best efficiency, when the switch 31 in OFF state turns ON, the following two conditions need to be satisfied. Specifically, one of the two conditions is that the voltage at the node A is substantially 0 V. If the switch 31 is made up of bipolar transistors, then a collector-emitter voltage is produced to make the voltage at the node A not equal to 0 V. That is why not every circuit should have a voltage of 0 V but the voltage should be 0 V in as many circuits as possible. The other condition is that the voltage waveform has a gradient that is substantially equal to zero.

The waveform of the voltage at the node A shown in FIG. 2 satisfies both of these two conditions. These conditions can be met by appropriately setting the L1, C1, L2 and C2 values of the class E amplifier 511 according to the load on the transmitting-end resonant circuit 91 as viewed from the class E amplifier 511. In that case, the class E amplifier 511 outputs a voltage with a substantially sinusoidal waveform like the one shown in portion (c) of FIG. 2. Nevertheless, the waveform does not have to be exactly sinusoidal.

On the other hand, the node B of the switch 31 connected to ground or the earth (which will sometimes be abbreviated herein as GND) by way of the detector 41.

The detector 41 detects either the current flowing from the switch 31 to GND or the voltage at the node B and notifies the signal extractor 221 of the result of detection. The detector 41 may be implemented as a resistive element that converts current into a voltage. By using such a resistive element, the current flowing from the switch 31 to GND can be detected. Specifically, the detector 41 detects the waveform of current flowing through the node B of the switch 31, which varies with the impedance value of the impedance changer 42 on the power receiver 2 as will be described later.

Based on that variation in waveform that has been sensed by the detector 41 (i.e., the current waveform 311), the signal extractor 221 determines whether or not there is a data signal. If the answer is YES, the signal extractor 221 extracts that data signal 321. The data represented by the data signal is what has been transmitted from the power receiver 2 to the power transmitter 1. Any data can be transmitted. For example, the data is a command for the power transmitter 1 transmitted from the power receiver 2.

It should be noted that it is not necessary for the signal extractor 221 to determine whether or not there is a data signal. The signal extractor 221 may extract a signal directly from the received current waveform 311. The signal thus obtained and having a predetermined amplitude will be processed as the data signal 321.

The output of the class E amplifier 511 is transmitted from the transmitting-end resonant circuit 91 to the receiving-end resonant circuit 92 of the power receiver 2 that is electromagnetically coupled with the power transmitter 1. The AC signal that has been received at the receiving-end resonant circuit 92 gets rectified by the rectifier circuit 52, passed through the impedance changer 42 and then input to the power reproducing section 82. In response, the power reproducing section 82 outputs the signal received as supply voltage to be supplied to the circuits of the power receiver 2.

The power is transmitted wirelessly from the power transmitter 1 to the power receiver 2 in this manner.

Next, it will be described how to transmit data from the power receiver 2 to the power transmitter 1.

In transmitting data from the power receiver 2 to the power transmitter 1, the impedance changer 42 that is arranged between the rectifier circuit 52 and the power reproducing section 82 changes the impedance value. As a result, in the power transmitter 1, the impedance value of the transmitting-end resonant circuit 91 as viewed from the class E amplifier 511 changes.

Then, the waveform of the voltage at the node A of the class E amplifier 511 deviates from the one achieved by the best class E amplification operation described above. Consequently, the waveform varies as shown in portions (a) through (e) of FIG. 3. Specifically, portion (a) of FIG. 3 illustrates the waveform at the node A of the class E amplifier 511 when the impedance is optimum. On the other hand, portions (b) through (e) of FIG. 3 illustrate possible variations in the waveform at the node A when the impedance is not optimum. Portion (f) of FIG. 3 shows the timings to turn the switch 31 ON or OFF. The waveforms shown in portion (b) through (e) of FIG. 3 indicate that the two conditions specified above to make the class E amplifier 511 operate with the best efficiency are not satisfied.

The waveform variations at the node A can be classified into the following four wave shapes:

(1) After the switch in ON state has turned OFF, the voltage once rises to a peak, and then falls monotonically, when the switch in OFF state turns ON again. The voltage will go substantially 0 V after going through a discharge for some time as shown in portion (b) of FIG. 3;

(2) After the switch in ON state has turned OFF, the voltage once rises to a peak, and then falls for a while but stars to rise again, when the switch in OFF state turns ON again. The voltage will go substantially 0 V after going through a discharge for some time as shown in portion (a) of FIG. 3;

(3) After the switch in ON state has turned OFF, the voltage once rises to a peak, and then falls to almost 0 V, remains there for a while, but stars to rise again, when the switch in OFF state turns ON again. The voltage will go substantially 0 V again after going through a discharge for some time as shown in portion (d) of FIGS. 3; and (4) After the switch in ON state has turned OFF, the voltage once rises to a peak, and then falls to almost 0 V, and remains there for a while, when the switch in OFF state turns ON again. The voltage continues to be substantially 0 V as shown in portion (e) of FIG. 3.

The present inventors discovered that by changing the impedance value of the impedance changer 42 of the power receiver 2 on purpose so as to make a transition intentionally into a state where the impedance is not optimum and by sensing a variation in the current waveform at the node A to be caused on the power transmitter 1 as a result, the data signal that has been transmitted from the power receiver 2 to the power transmitter 1 can be extracted.

This point will be described in further detail. Portion (a) of FIG. 4 shows the waveform at the node A and the current waveform detected by the detector 41 of the power transmitter 1 when the impedance is optimum. In such a situation, there is no variation in the current waveform detected.

To cause any of the waveform variations shown in portions (b) through (d) of FIG. 3 in such a state, the impedance changer 42 of the power receiver 2 changes the impedance value. In that case, if the current flowing through the detector 41 of the power transmitter 1 is detected, the current will have a waveform that rises such as the one shown in portion (b) of FIG. 4. This is the current discharged from the switch 31 of the class E amplifier 511 since the switch 31 in OFF state turned ON and until the discharge is done as shown in portion (c) of FIG. 4. By sensing that variation, the signal extractor 221 generates a data signal that goes one if the waveform rises when the switch 31 in OFF state turns ON but remains zero otherwise. As a result, the data to be transmitted from the power receiver 2 to the power transmitter 1 can be detected.

It should be noted that the clock signal of the power transmitter 1 itself could be used as a timing signal to determine whether or not there is such a rise in waveform. The pulse width of the clock signal of the power transmitter 1 itself is usually much shorter than the period of time it takes for the current waveform that has once risen to finish falling. That is why it is easy to detect such peaks that appear at very short time intervals.

In the example described above, a data signal level "one" is allocated to each rise in the waveform. However, such processing is just an example. Alternatively, the current detection waveform may be monitored a number of times every time the switch 31 in OFF state turns ON, and the level of the data signal may be determined to be one or zero by the ratio of the number of times the rises have been detected to the number of times no rises have been detected. For instance, FIG. 1 illustrates how the signal extractor 221 generates a received data signal 321 that goes one based on a current detection waveform 311 that rises four times.

Also, the waveform of the current being discharged from the switch 31 continues to vary from the instant the switch 31 in OFF state turned ON through the point in time the discharge is finished. That is why if the output signal of the periodic signal generator 61 that turns the switch 31 is used as a timing signal, the data level decision can be made even without providing any additional timing signal to make the data level decision for the signal extractor 221. For that reason, as there is no need to provide a clock data recovery circuit for generating a timing signal, the circuit can be simplified and the increase in cost can be minimized.

As described above, the wireless power transmission system 100 that transmits power wirelessly from the power transmitter 1 to the power receiver 2 can transmit power to the power receiver 2 by using a class E amplifier 511 for the power transmitter 1. Furthermore, by varying the impedance value of the power receiver 2 according to the data transmitted and by detecting the waveform of current or voltage when the switch 31 of the class E amplifier 511 is discharged, data can be transmitted from the power receiver 2 to the power transmitter 1.

That data may be used to determine whether the power receiver is an authorized device or not (i.e., to authenticate the power transmitter), for example. If the power receiver transmits data with level "one" to the power transmitter on a regular basis, then the power transmitter can recognize that the power receiver as an authorized power receiver. Then, the power transmitter gets its own transmitting-end resonant circuit and the receiving-end resonant circuit of the power receiver electromagnetically coupled together at a resonant frequency and gets resonance produced between them by a non-contact method, thereby transmitting power to the power receiver. In this manner, it is possible to prevent an unauthorized power receiver from stealing the power. Optionally, the data transmitted may be used as a piece of information to check out pairing between the power transmitter and the power receiver.

In the preferred embodiment described above, the switch 31 may be made up of semiconductor switching elements such as field effect transistors or bipolar transistors, or mechanical switching elements if the frequency of switching may be low, or any other kind of switching elements that can selectively connect and disconnect two points to/from each other.

Embodiment 2

FIG. 5 is a block diagram illustrating an exemplary configuration for a wireless power transmission system 110 as a second preferred embodiment of the present invention. In FIG. 5, any component also included in the wireless power transmission system of the first preferred embodiment described above and having substantially the same function as its counterpart is identified by the same reference numeral and a detailed description thereof will be omitted herein.

In the first preferred embodiment of the present invention described above, data is supposed to be transmitted only in one direction from the power receiver 2 to the power transmitter 1. On the other hand, a wireless power transmission system 110 according to this second preferred embodiment of the present invention can not only transmit power wirelessly from the power transmitter 1 to the power receiver 2 but also transmit data bidirectionally between the power transmitter 1 and the power receiver 2 using a class E amplifier.

Hereinafter, it will be described with reference to FIGS. 5 and 6 what configuration the wireless power transmission system 110 has and how that system 110 works. Specifically, portions (a) through (e) of FIG. 6 show the waveforms of signals to be generated or detected in the wireless power transmission system 110.

As shown in FIG. 5, a first transmission data signal 421 (see portion (a) of FIG. 6) is input to a voltage controller 251. The first transmission data signal 421 (see portion (a) of FIG. 6) may be regarded as a data signal to be transmitted from the power transmitter 1 to the power receiver 2.

In response to the first transmission data signal 421 that has been given, the voltage controller 251 controls the output voltage of the power supply 191 as shown in portion (a) of FIG. 6. In other words, the voltage controller 251 controls the output voltage of the power supply 191 so that the waveform of the output voltage of the power supply 191 varies just like that of the first transmission data signal 421 (see portion (a) of FIG. 6).

In this case, when the output voltage of the power supply 191 varies, the amplitude of the output waveform of the class E amplifier 511 changes according to the output voltage of the power supply 191 shown in portion (b) of FIG. 6. As a result, the output of the class E amplifier 511 can be subjected to amplitude modulation. When the output voltage of the power supply 191 varies, the waveform of the class E amplifier 511 at the node A changes in the amplitude direction as already described for the first preferred embodiment. However, the waveform at the node A just changes its amplitude. That is why if the waveform at the node A is as shown in portion (b) of FIG. 4 before the output voltage of the power supply 191 varies, then the waveform at the node A will still be as shown in portion (b) of FIG. 4 even after the output voltage of the power supply 191 has varied. The current detection waveform shown in portion (b) of FIG. 4 can be detected when the switch 31 in OFF state turns ON. Consequently, the transmission of data from the power receiver 2 to the power transmitter 1 as already described for the first preferred embodiment can also be carried out in this preferred embodiment.

If the output signal of the class E amplifier 511 is subjected to the amplitude modulation as shown in portion (b) of FIG. 6, then the output of the rectifier circuit 52 of the power receiver 2 will also have an amplitude-modulated waveform as shown in portion (c) of FIG. 6. The output of the rectifier circuit 52 is passed to a data demodulator 292 and the power reproducing section 82 by way of the impedance changer 42. The power reproducing section 82 outputs the power that has been supplied to the circuits of the power receiver 2 as shown in portion (e) of FIG. 8. On the other hand, the data demodulator 292 subjects the output signal of the rectifier circuit 52 to waveform processing such as an envelope detection, thereby outputting a first received data signal 422. In this manner, the data that has been transmitted from the power transmitter 1 can be demodulated (or decoded) as shown in portion (d) of FIG. 6.

As described above, in the wireless power transmission system 110 of this preferred embodiment, not only power can be transmitted wirelessly from the power transmitter 1 to the power receiver 2 by using the class E amplifier 511 for the power transmitter 1 but also data can be transmitted from the power transmitter 1 to the power receiver 2. The data is transmitted from the power transmitter 1 to the power receiver 2 by controlling the output voltage of the power supply 191 of the class E amplifier 511 and making amplitude modulation on the output of the class E amplifier 511 with the data signal to be transmitted from the power transmitter 1 to the power receiver 2. On the other hand, data is transmitted from the power receiver 2 to the power transmitter 1 by varying the impedance value of the power receiver 2 according to the data transmitted and by sensing its associated variation in current waveform on the power transmitter 1 as in the first preferred embodiment described above. As a result, data can be transmitted bidirectionally between the power transmitter 1 and the power receiver 2.

In the preferred embodiment described above, the voltage controller 251 is supposed to control the output voltage of the power supply 191 in order to make an amplitude modulation on the output of the class E amplifier 511. Alternatively, the voltage controller 251 may perform a pulse width modulation on the output voltage of the power supply 191 in order to make a pulse width modulation on the output of the class E amplifier 511. Speaking more generally, any method for modulating data by controlling the power supply 191 of the class E amplifier 511 may be adopted.

In the preferred embodiment described above, the rectifier circuit 52 is illustrated as a full-wave rectifier circuit in FIG. 6. However, the rectifier circuit 52 may also be a half-wave rectifier circuit. Speaking more generally, any rectification method may be adopted as long as data demodulation and power reproduction can both be done.

Embodiment 3

FIG. 7 is a block diagram illustrating an exemplary configuration for a wireless power transmission system 120 as a third preferred embodiment of the present invention. In FIG. 7, any component also included in the wireless power transmission system of the first or second preferred embodiment described above and having substantially the same function as its counterpart is identified by the same reference numeral and a detailed description thereof will be omitted herein.

The wireless power transmission system of the second preferred embodiment described above is designed to modulate the data to be transmitted from the power transmitter 1 to the power receiver 2 by controlling the power supply 191 of the class E amplifier 511. According to this third preferred embodiment, on the other hand, data is modulated by making a pulse width modulation on the periodic signal, which is a wave to be input to the class E amplifier 511.

Hereinafter, it will be described with reference to FIGS. 7 and 8 what configuration the wireless power transmission system 110 has and how that system 120 works. Specifically, portions (a) through (e) of FIG. 8 show the waveforms of signals to be generated or detected in the wireless power transmission system 120.

A PWM signal generator 291 makes a pulse width modulation on the first transmission data signal 421 (see portion (a) shown in FIG. 8), thereby outputting a signal as shown in portion (b) of FIG. 8. A modulator 111 multiplies together that signal and the output signal of the periodic signal generator 61 and supplies the product to the switch 31 of the class E amplifier 511.

The output of the class E amplifier 511 becomes a periodic signal while a periodic signal is being input to the switch 31 but becomes no signal while nothing is input to the switch 31 as shown in portion (c) of FIG. 8. The output of the class E amplifier 511 is transmitted from the transmitting-end resonant circuit 91 to the receiving-end resonant circuit 92 and then gets rectified by the rectifier circuit 52 as shown in portion (d) of FIG. 8.

The output of the rectifier circuit 52 is passed through the impedance changer 42 to an envelope detector 452 and the power reproducing section 82, which outputs power to be supplied to the circuits of the power receiver 2 as shown in portion (g) of FIG. 8. On the other hand, the envelope detector 452 subjects the output signal of the rectifier circuit 52 to an envelope detection as shown in portion (e) of FIG. 8. The output signal of the envelope detector 452 becomes the same as the pulse width modulation signal that is the output signal of the PWM generator 291 of the power transmitter 1. A PWM signal demodulator 332 subjects the pulse width modulation signal thus obtained to pulse width demodulation, which is the inverse type of processing to what has been done by the PWM signal generator 291, thereby outputting a first received data signal 422 as shown in portion (f) of FIG. 8.

The method for transmitting data from the power receiver 2 to the power transmitter 1 is almost the same as what is adopted in the first preferred embodiment described above. According to this preferred embodiment, however, the output of the class E amplifier 511 is modulated with a pulse width modulated periodic signal. That is why while a periodic signal is being output, the data to be transmitted from the power receiver 2 to the power transmitter 1 can be detected by detecting a current detection waveform such as the one shown in portion (b) of FIG. 4. Since a pulse width modulation technique is adopted, there are some intervals in which no periodic signals are output. And during such intervals, no variation in the current flowing through the switch 31 can be sensed because the amount of current flowing through the switch 31 is substantially equal to zero then.

Thus, according to this preferred embodiment in which a pulse width modulated signal is supposed to be transmitted, data is transmitted from the power receiver 2 to the power transmitter 1 while a periodic signal being subjected to the pulse width modulation is output. For example, the pulse width modulation may be carried out so that there always is a periodic signal within each single time slot (i.e., so that the pulse width does not become equal to zero). And by transmitting at least one bit of data per time slot from the power receiver 2 to the power transmitter 1, the data transfer rate can be kept as high as the rate of transferring data from the power transmitter 1 to the power receiver 2.

In the first preferred embodiment of the present invention described above, the output signal of the periodic signal generator 61 is supposed to be used as a timing signal. However, while no periodic signal is output, the data level decision cannot be made as described above even when tried. That is why if the output signal of the modulator 111 is used as a timing signal, then the data level can be detected using the signal as a timing signal while a periodic signal is being output because there is a periodic signal, but is not detected while no periodic signals are output because there are no sensible signals. In this manner, the data level decision that has been made while no data can be detected can be invalidated, and therefore, the accuracy of the data level decision can be increased.

As described above, in the wireless power transmission system 120 of this preferred embodiment, not just power can be transmitted wirelessly from the power transmitter 1 to the power receiver 2 by using the class E amplifier 511 for the power transmitter 1 but also data can be transmitted from the power transmitter 1 to the power receiver 2 as well. The data is transmitted from the power transmitter 1 to the power receiver 2 by making a pulse width modulation on not only the periodic signal being input to the class E amplifier 511 but also the output of the class E amplifier 511 using the data signal to be transmitted from the power transmitter 1 to the power receiver 2. On the other hand, data is transmitted from the power receiver 2 to the power transmitter 1 by varying the impedance value of the power receiver 2 according to the data transmitted and by sensing its associated variation in current waveform on the power transmitter 1 as in the first and second preferred embodiments described above. As a result, data can be transmitted bidirectionally between the power transmitter 1 and the power receiver 2.

In the preferred embodiment described above, the rectifier circuit 52 is illustrated as a full-wave rectifier circuit in FIG. 8. However, the rectifier circuit 52 may also be a half-wave rectifier circuit. Speaking more generally, any rectification method may be adopted as long as data demodulation and power reproduction can both be done.

According to the second and third preferred embodiments of the present invention described above, data can be transmitted bidirectionally. If the power receiver responds within a predetermined period of time since a point of time when the power transmitter requested a response, then the power transmitter may authenticate that power receiver and may allow that power receiver to continue to receive power after that. On the other hand, if the power receiver either has failed to respond or has returned an expected response, then the power transmitter need not authenticate that power receiver and may stop transmitting power to that power receiver. Optionally, the data to be exchanged may also be used as a piece of information for making pairing between the power transmitter and the power receiver.

In the first, second and third preferred embodiments of the present invention described above, the signal extractor 221 is supposed to determine, based on a variation in waveform that has been sensed by the detector 41 (i.e., the current waveform 311), whether or not a data signal is output, and extract that data signal 321 if the answer is YES. However, the signal extractor 221 does not always have to determine whether or not a data signal is output. Alternatively, the signal extractor 221 may always extract and output some signal from the signal waveform that has been sensed by the detector 41. For example, while continuously receiving the output signal of the detector 41, the signal extractor 221 may subject that output signal to the processing that is supposed to be performed according to the first preferred embodiment if a data signal is output. And if the output signal waveform supplied from the detector 41 includes a data signal, then the signal extractor 221 extracts the received data signal 321. On the other hand, if the output signal waveform supplied from the detector 41 includes no data signals, then the signal extractor 221 extracts a signal with a constant level, of which the waveform has no rises or falls. As to whether or not the output signal of the signal extractor 221 includes the data that has been transmitted from the power receiver 2, a processor on a following stage (not shown) may determine it.

In the preferred embodiments described above (e.g., in the first preferred embodiment shown in FIG. 1), the detector 41 is supposed to detect either the current flowing from the switch 31 to GND or the voltage at the node B. However, in order to detect current or a voltage by the detecting method described above, current should be supplied, which in turn involves some power loss.

To cut down such power loss, the detector 41 may be arranged somewhere else. FIG. 9 is a block diagram illustrating a configuration for a wireless power transmission system 130 as a modified example of the first preferred embodiment of the present invention. Unlike the wireless power transmission system 100 of the first preferred embodiment, this wireless power transmission system 130 makes a detector 241 detect a voltage at the node A. Due to this difference, no node B is shown in FIG. 9.

Hereinafter, it will be described how some components of this modified example that have something to do with that difference work. The other components and a detailed operation of the system are the same as what has already been described for the first preferred embodiment, and description thereof will be omitted herein.

The detector 241 detects a voltage at the node A. In this case, to make substantially no current flow from the node A to the detector 241, the impedance of the detector 241 should be set to be sufficiently high. The voltage waveform shown in FIG. 3 will be detected at the node A. As this voltage is relatively high, the detector 241 and the signal extractor 221 should have a performance that is high enough to withstand the voltage expected. That is to say, their breakdown voltage should be set to be relatively high.

With such an arrangement adopted, the power loss that is usually involved with the operation of transmitting data from the power receiver 2 to the power transmitter 1 can be cut down.

It should be noted that the arrangement shown in FIG. 9 is just an example. And the same modification is also applicable in quite the same way to the detector of the wireless power transmission system of the second or third preferred embodiment of the present invention described above. That is to say, in the wireless power transmission system 110 of the second preferred embodiment shown in FIG. 5 or in the wireless power transmission system 120 of the third preferred embodiment shown in FIG. 7, a detector 241 with the characteristic described above and a signal extractor 221 to be connected to the detector 241 may be arranged at the position shown in FIG. 9.

A wireless power transmission system according to the present invention can transmit data either in one direction or bidirectionally between a power transmitter, which transmits power wirelessly to a power receiver, and that power receiver. That data may be used for authentication purposes when the system should determine whether or not the power receiver is authorized to receive the power that has been transmitted wirelessly. Consequently, the present invention can be used effectively in numerous electronic appliances to be implemented as a wireless power transmission system with a power transmitter and a power receiver.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2010-285799 filed on Dec. 22, 2010 and No. 2011-263408 filed on Dec. 1, 2011, the entire contents of which are hereby incorporated by reference.

What is claimed is:

1. A wireless power transmission system that transmits power wirelessly from a power transmitter to a power receiver,
wherein the power transmitter includes:
a periodic signal generator, which generates a periodic signal;
a switch, which performs a switching operation in response to the periodic signal supplied from the periodic signal generator;
a first inductor, which connects a DC power supply to one terminal of the switch;
a first capacitor, which connects the one terminal of the switch to ground;
an LC resonant circuit, which is comprised of a second inductor and a second capacitor that are connected to the one terminal of the switch;
a transmitting-end resonant circuit, which is connected to the LC resonant circuit and of which the resonant frequency substantially corresponds with one period of the periodic signal;
a detector, which detects a voltage at the one terminal of the switch or current or a voltage at the other terminal of the switch; and
a signal extractor, which extracts a signal from the output of the detector,
the power transmitter performing a class E amplification operation that converts power supplied from the DC power supply into an AC signal that has substantially the same frequency as the periodic signal by turning the switch using the periodic signal, and
wherein the power receiver includes:
a receiving-end resonant circuit, which is coupled electromagnetically to, and produces resonance with, the transmitting-end resonant circuit;
a rectifier circuit, which rectifies a signal that has been received at the receiving-end resonant circuit;
an impedance changer, which connects the rectifier circuit to a power reproducing section;
the power reproducing section, which reproduces power for the power receiver based on the output of the impedance changer; and
a controller, which changes the impedance of the impedance changer according to the signal to be transmitted from the power receiver to the power transmitter.

2. The wireless power transmission system of claim 1, wherein when the controller changes the impedance of the impedance changer, either the amount of current flowing from the other terminal of the switch to the ground or a voltage at the other terminal of the switch varies, and
wherein the detector senses that variation, thereby transmitting the signal from the power receiver to the power transmitter.

3. The wireless power transmission system of claim 1, wherein the signal extractor extracts the signal from the output of the detector by using the output of the periodic signal generator as a timing signal.

4. The wireless power transmission system of claim 1, wherein the detector is implemented as a resistive element, and
wherein in detecting the current or voltage at the other terminal of the switch, the detector applies a voltage, which has been generated by the current flowing from the switch to the ground, to the signal extractor, and wherein the signal extractor extracts the signal based on the applied voltage.

5. The wireless power transmission system of claim 1, wherein the switch is made up of either field effect transistors or bipolar transistors.

6. A wireless power transmission system that transmits power wirelessly from a power transmitter to a power receiver,
wherein the power transmitter includes:
a periodic signal generator, which generates a periodic signal;
a switch, which performs a switching operation in response to the periodic signal supplied from the periodic signal generator;
a first inductor, which connects a DC power supply to one terminal of the switch;
a first capacitor, which connects the one terminal of the switch to ground;
an LC resonant circuit, which is comprised of a second inductor and a second capacitor that are connected to the one terminal of the switch;
a transmitting-end resonant circuit, which is connected to the LC resonant circuit and of which the resonant frequency substantially corresponds with one period of the periodic signal;
a detector, which detects a voltage at the one terminal of the switch or current or a voltage at the other terminal of the switch;
a signal extractor, which extracts a signal from the output of the detector; and
a voltage controller, which controls the output voltage of the DC power supply in accordance with a first transmission signal to be transmitted from the power transmitter to the power receiver,
the power transmitter performing a class E amplification operation that converts power supplied from the DC power supply into an AC signal that has substantially the same frequency as the periodic signal by turning the switch using the periodic signal, and
wherein the power receiver includes:
a receiving-end resonant circuit, which is coupled electromagnetically to, and produces resonance with, the transmitting-end resonant circuit;
a rectifier circuit, which rectifies a signal that has been received at the receiving-end resonant circuit;
an impedance changer, which connects the rectifier circuit to a power reproducing section;
the power reproducing section, which reproduces power for the power receiver based on the output of the impedance changer;
a demodulator, which demodulates the first transmission signal based on the output of the impedance changer; and
a controller, which changes the impedance of the impedance changer according to a second transmission signal to be transmitted from the power receiver to the power transmitter.

7. The wireless power transmission system of claim 6, wherein when the controller changes the impedance of the impedance changer, either the amount of current flowing from the other terminal of the switch to the ground or a voltage at the other terminal of the switch varies, and
wherein the detector senses that variation, thereby transmitting the second transmission signal from the power receiver to the power transmitter.

8. The wireless power transmission system of claim 6, wherein the signal extractor extracts the signal from the output of the detector by using the output of the periodic signal generator as a timing signal.

9. The wireless power transmission system of claim 6, wherein the detector is implemented as a resistive element, and
wherein in detecting the current or voltage at the other terminal of the switch, the detector applies a voltage, which has been generated by the current flowing from the switch to the ground, to the signal extractor, and
wherein the signal extractor extracts the signal based on the applied voltage.

10. The wireless power transmission system of claim 6, wherein the voltage controller changes the output voltage of the DC power supply according to the first transmission signal, thereby making the output signal of the transmitting-end resonant circuit have a waveform, of which the amplitude has been modulated with the first transmission signal by using, as a carrier, an AC signal, of which the frequency is substantially equal to the resonant frequency of the transmitting-end and receiving-end resonant circuits.

11. The wireless power transmission system of claim 6, wherein the voltage controller carries out pulse width modulation on the output voltage of the DC power supply according to the first transmission signal, thereby making the output signal of the transmitting-end resonant circuit have a waveform, of which the pulse width has been modulated with the first transmission signal by using, as a carrier, an AC signal, of which the frequency is substantially equal to the resonant frequency of the transmitting-end and receiving-end resonant circuits.

12. The wireless power transmission system of claim 6, wherein the switch is made up of either field effect transistors or bipolar transistors.

13. A wireless power transmission system that transmits power wirelessly from a power transmitter to a power receiver,
wherein the power transmitter includes:
a periodic signal generator, which generates a periodic signal;
a pulse width modulation signal generator, which generates a pulse width modulation signal in accordance with a first transmission signal to be transmitted from the power transmitter to the power receiver;
a modulator, which modulates the periodic signal with the pulse width modulation signal;
a switch, which performs a switching operation in accordance with the output of the modulator;
a first inductor, which connects a DC power supply to one terminal of the switch;
a first capacitor, which connects the one terminal of the switch to ground;
an LC resonant circuit, which is comprised of a second inductor and a second capacitor that are connected to the one terminal of the switch;
a transmitting-end resonant circuit, which is connected to the LC resonant circuit and of which the resonant frequency substantially corresponds with one period of the periodic signal;
a detector, which detects a voltage at the one terminal of the switch or current or a voltage at the other terminal of the switch; and
a signal extractor, which extracts a signal from the output of the detector,
wherein the power receiver includes:
a receiving-end resonant circuit, which is coupled electromagnetically to, and produces resonance with, the transmitting-end resonant circuit;
a rectifier circuit, which rectifies a signal that has been received at the receiving-end resonant circuit;
an impedance changer, which connects the rectifier circuit to a power reproducing section;
the power reproducing section, which reproduces power for the power receiver based on the output of the impedance changer;
an envelope detector, which detects the envelope of the output of the impedance changer;
a pulse width modulation signal demodulator, which demodulates the first transmission signal based on the output of the envelope detector; and
a controller, which changes the impedance of the impedance changer according to second transmission signal to be transmitted from the power receiver to the power transmitter.

14. The wireless power transmission system of claim 13, wherein in a period during which the periodic signal is provided as the output of the modulator, the power transmitter performs a class E amplification operation that converts power supplied from the DC power supply into an AC signal that has substantially the same frequency as the periodic signal by turning the switch, and
wherein in an interval during which there is no output of the modulator, the power transmitter stops outputting.

15. The wireless power transmission system of claim 13, wherein when the controller changes the impedance of the impedance changer, either the amount of current flowing from the other terminal of the switch to the ground or a voltage at the other terminal of the switch varies, and
wherein the detector senses that variation, thereby transmitting the second transmitting signal from the power receiver to the power transmitter.

16. The wireless power transmission system of claim 13, wherein the signal extractor extracts the signal from the output of the detector by using the output of the periodic signal generator as a timing signal.

17. The wireless power transmission system of claim 13, wherein the signal extractor uses the output of the modulator, which has been obtained by modulating the periodic signal with the pulse width modulation signal, as a timing signal, determines that the output of the modulator is valid as the timing signal if the periodic signal is provided as the output of the modulator but that the output of the modulator is invalid as the timing signal if no periodic signal is provided as the output of the modulator, and extracts the signal from the output of the detector only if the output of the modulator is determined to be valid as the timing signal.

18. The wireless power transmission system of claim 13, wherein the detector is implemented as a resistive element, and
wherein in detecting the current or voltage at the other terminal of the switch, the detector applies a voltage, which has been generated by the current flowing from the switch to the ground, to the signal extractor, and
wherein the signal extractor extracts the signal based on the applied voltage.

19. The wireless power transmission system of claim 13, wherein the switch is made up of either field effect transistors or bipolar transistors.

20. A wireless power transmission system that transmits power wirelessly from a power transmitter to a power receiver,
wherein the power transmitter includes:
a class E amplifier, which produces AC energy;
a transmitting-end resonant circuit, which transmits the AC energy into space;
a detector, which detects a voltage or current waveform at a predetermined position in the class E amplifier in accordance with the impedance of the transmitting-end resonant circuit as viewed from the class E amplifier; and a signal extractor, which extracts a signal according to the waveform, and wherein the power receiver includes:

a receiving-end resonant circuit, which receives at least a part of the AC energy that has been transmitted by the transmitting-end resonant circuit;

a rectifier circuit, which rectifies and outputs at least the part of the AC energy that has been received at the receiving-end resonant circuit;

a power reproducing section, which outputs power based on the output of the rectifier circuit; and an impedance changer, which is connected between the rectifier circuit and the power reproducing section to change the impedance, and wherein as the impedance changer changes the impedance, the detector detects a waveform when the impedances match and a waveform when the impedance do not match and the signal extractor extracts and outputs a signal associated with the waveform that has been detected by the detector.

21. The wireless power transmission system of claim 20, wherein the power transmitter further includes a voltage controller that modulates the output voltage of the class E amplifier according to transmission signal to be transmitted, and wherein the power receiver further includes a demodulator, which demodulates the transmission signal by subjecting the output of the rectifier circuit to predetermined waveform processing.

22. The wireless power transmission system of claim 20, wherein the power transmitter further includes a periodic signal generator, which generates a periodic signal, a PWM signal generator, which carries out a pulse width modulation on the transmission signal to be transmitted, and a modulator, which multiplies together the periodic signal and the pulse-width-modulated transmission signal, and wherein the power receiver further includes an envelope detector, which performs envelope detection waveform processing on the output of the rectifier circuit, and a PWM signal demodulator, which carries out a pulse width demodulation on the output of the rectifier circuit that has been subjected to the waveform processing, thereby outputting the transmission signal.

* * * * *